(12) United States Patent
Fujiwara et al.

(10) Patent No.: US 7,764,421 B2
(45) Date of Patent: Jul. 27, 2010

(54) WAVELENGTH-CONVERTED LIGHT GENERATING APPARATUS AND GENERATING METHOD

(75) Inventors: Hiroyasu Fujiwara, Hamamatsu (JP); Motoichi Ohtsu, Tokyo (JP); Tadashi Kawazoe, Tokyo (JP)

(73) Assignees: Hamamatsu Photonics K.K., Hamamatsu-shi, Shizuoka (JP); The University of Tokyo, Bunkyo-ku, Tokyo (JP)

( * ) Notice: Subject to any disclaimer, the term of this patent is extended or adjusted under 35 U.S.C. 154(b) by 0 days.

(21) Appl. No.: 12/410,871

(22) Filed: Mar. 25, 2009

(65) Prior Publication Data

US 2009/0257114 A1 Oct. 15, 2009

(30) Foreign Application Priority Data

Mar. 26, 2008 (JP) .......................... P2008-081285

(51) Int. Cl.
G02F 1/35 (2006.01)
(52) U.S. Cl. ........................................ 359/326; 372/22
(58) Field of Classification Search ......... 359/326–332; 372/21, 22
See application file for complete search history.

(56) References Cited

U.S. PATENT DOCUMENTS 4,803,688 A * 2/1989 Lawandy ..................... 372/21

FOREIGN PATENT DOCUMENTS

| JP | 2003-013236 | 1/2003 |
| JP | 2004-107744 | 4/2004 |
| JP | 2004-235574 | 8/2004 |
| JP | 2007-095859 | 4/2007 |

OTHER PUBLICATIONS

B. O'Brien, "Development of Infra-Red Sensitive Phosphors," Journal of the Optical Society of America, vol. 36, No. 7, Jul. 1946, pp. 369-371.
P. A. Franken et al., "Generation of Optical Harmonics," Physical Review Letters, vol. 7, No. 4, Aug. 15, 1961, pp. 118-119.

* cited by examiner

Primary Examiner—Daniel Petkovsek
(74) Attorney, Agent, or Firm—Drinker Biddle & Reath LLP

(57) ABSTRACT

A wavelength-converted light generating apparatus 1A includes: an excitation light source 10 supplying excitation light L0 of a predetermined wavelength; and a wavelength conversion element 20, in which an aggregate 22 of crystals of a dye molecule is held by a holding substrate 21 and which, by incidence of the excitation light L0, generates converted light L1 that has been wavelength-converted. The excitation light source 10 supplies the excitation light L0 of a wavelength longer than an absorption edge of the dye molecule to the wavelength conversion element 20. The wavelength conversion element 20, by incidence of the excitation light L0 on the crystal aggregate 22, generates and outputs the converted light (for example, visible light) L1 that has been wavelength-converted to a shorter wavelength than the excitation light (for example, near-infrared light) L0. A wavelength-converted light generating apparatus and generating method capable of favorably generating light of a shorter wavelength than incident light of a predetermined wavelength by wavelength conversion is thus realized.

10 Claims, 14 Drawing Sheets

(a)

(b)

(a)

(b)

(a)

(b)

(a)

(b)

WAVELENGTH-CONVERTED LIGHT GENERATING APPARATUS AND GENERATING METHOD

BACKGROUND OF THE INVENTION

1. Field of the Invention

The present invention relates to a wavelength-converted light generating apparatus and generating method for generating and outputting converted light resulting from wavelength conversion of excitation light made incident on a wavelength conversion element.

2. Related Background Art

As an optical element that performs wavelength conversion on infrared light as incident light and outputs visible light of a shorter wavelength than the infrared light as output light, there is conventionally known an element with which visible light energy, such as that of illumination light, is stored in a substance in advance and the stored energy is output as visible light luminescence by stimulation of the substance by incidence of infrared light (see Non-Patent Document 1, IR Sensor Card: Model #5842, manufactured by New Focus Inc.).

As an optical element that likewise performs wavelength conversion of infrared light to visible light, there is known an element that makes use of second harmonic generation or other nonlinear optical phenomenon to shorten a wavelength of infrared light and wavelength-convert the infrared light to visible light (see Non-Patent Document 2).

Patent Document 1: Japanese Patent Application Laid-Open No. 2007-95859

Patent Document 2: Japanese Patent Application Laid-Open No. 2004-235574

Patent Document 3: Japanese Patent Application Laid-Open No. 2003-13236

Patent Document 4: Japanese Patent Application Laid-Open No. 2004-107744

Non-Patent Document 1: B. O'Brien, "Development of Infra-Red Sensitive Phosphors," J. Opt. Soc. Am., Vol. 36, No. 7 (1946) pp. 369-371

Non-Patent Document 2: P. A. Franken et al., "Generation of Optical Harmonics," Phys. Rev. Lett., Vol. 7, No. 4 (1961) pp. 118-119

SUMMARY OF THE INVENTION

Of the above mentioned optical elements, with the configuration in which visible light energy is stored in a substance, there is a problem that only visible light corresponding to the energy stored in advance can be generated and the visible light decreases in emission intensity as the irradiation of infrared light is continued. To prevent such a decrease in the visible light intensity, an operation, such as reirradiation of the visible illumination light or changing of position of irradiation of the infrared light on the element, etc., must be performed during use of the optical element.

Also, in a configuration using second harmonic generation, etc., because a nonlinear optical phenomenon is used, an emission amount of the visible light varies nonlinearly with respect to a light amount of the incident infrared-light. Thus, for example, visible light generation by second harmonic waves cannot be made to occur efficiently unless a Q-switch laser or other infrared pulse light source having a high peak power is used, and applications of the element are limited.

Such problems generally arise in a likewise manner in performing a wavelength conversion of shortening a wavelength of light.

The present invention has been made to resolve the above problems, and an object thereof is to provide a wavelength-converted light generating apparatus and a wavelength-converted light generating method capable of favorably generating light of a shorter wavelength than incident light of a predetermined wavelength by wavelength conversion.

The present inventors examined in detail the above-described wavelength conversion for generating converted light of a shorter wavelength than incident light. As a result, the present inventors found that such wavelength conversion can be performed by making use of special properties of near-field light, which is an electromagnetic wave that leaks out near a surface of a substance (see, for example, Patent Documents 1 to 4), and thereby arrived at the present invention.

That is, a wavelength-converted light generating apparatus according to the present invention includes: (1) an excitation light supplying unit supplying excitation light of a predetermined wavelength; and (2) a wavelength conversion element, in which an aggregate of crystals of a dye molecule is held by a crystal holding unit and which, by incidence of the excitation light, generates converted light that has been wavelength-converted; and (3) the excitation light supplying unit supplies, as the excitation light, light of a wavelength longer than an absorption edge of the dye molecule to the wavelength conversion element, and (4) the wavelength conversion element, by incidence of the excitation light on the dye molecule crystal aggregate, generates and outputs the converted light that has been wavelength-converted to a shorter wavelength than the excitation light.

A wavelength-converted light generating method according to the present invention includes: (1) an excitation light supplying step of supplying excitation light of a predetermined wavelength; and (2) a wavelength conversion step of using a wavelength conversion element, in which an aggregate of crystals of a dye molecule is held by a crystal holding unit, to generate converted light that has been wavelength-converted by incidence of the excitation light on the wavelength conversion element; and (3) in the excitation light supplying step, light of a wavelength longer than an absorption edge of the dye molecule is supplied as the excitation light to the wavelength conversion element, and (4) in the wavelength conversion step, by incidence of the excitation light on the dye molecule crystal aggregate, the converted light that has been wavelength-converted to a shorter wavelength than the excitation light is generated and output.

In the above-described wavelength-converted light generating apparatus and generating method, the element having the crystal aggregate, in which a plurality of crystals of the dye molecule are put in a state of being in proximity of each other, held by the holding unit is used as the wavelength conversion element. When the excitation light, which is of a wavelength longer than the absorption edge of the dye molecule and by which electron level is not excited, is made incident on such a wavelength conversion element, near-field light is generated near a surface of the dye molecule crystal on which the excitation light is made incident.

In this process, by a steep electric field gradient of the near-field light, a vibrational level is excited in the dye molecule inside the crystal near the irradiated crystal and the converted light that includes a wavelength component of a shorter wavelength (energy component of higher energy) than the excitation light is generated. Thus, with such a configuration where the dye molecule crystal aggregate is used as a wavelength conversion medium, by use of the near-field light, wavelength conversion that generates the converted light, which is of a shorter wavelength than the excitation light and is not generated by luminescence generation by electron level excitation in a normal absorption process, can be realized favorably.

According to the above-described wavelength-converted light generating apparatus and generating method, by using the wavelength conversion element, in which the dye molecule crystal aggregate is held by the holding unit, and making the excitation light of a longer wavelength than the absorption edge of the dye molecule be incident on the crystal aggregate to generate the converted light that has been wavelength-converted from the excitation light by use of the near-field light, the wavelength conversion of generating and outputting the converted light of a shorter wavelength than the excitation light can be realized favorably.

The present invention will be more fully understood from the detailed description given herein below and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
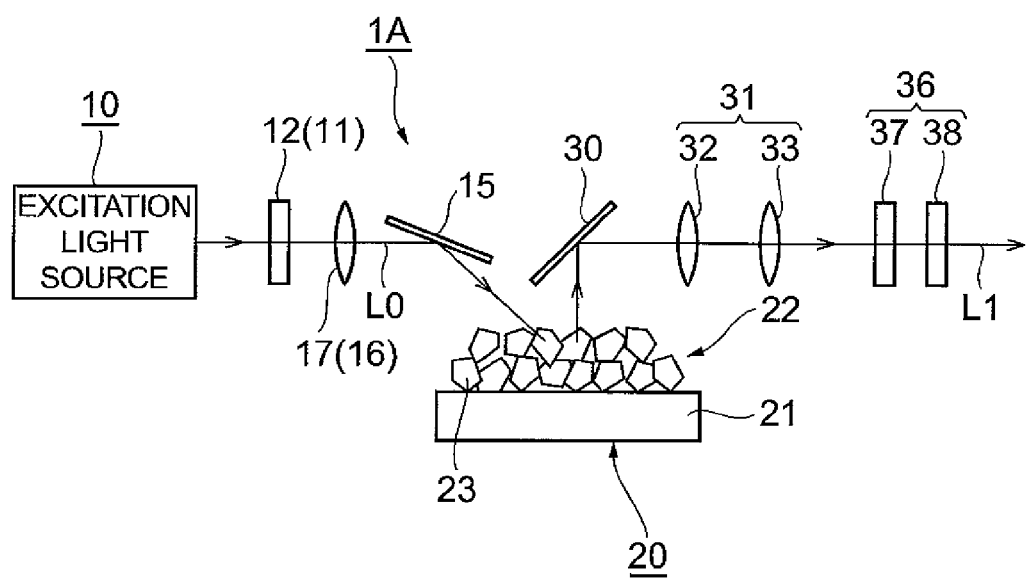
FIG. 1 is a diagram of a configuration of an embodiment of a wavelength-converted light generating apparatus.

Preferred embodiments of the wavelength-converted light generating apparatus and the wavelength-converted light generating method according to the present invention shall now be described in detail along with the drawings. In the description of the drawings, elements that are the same are provided with the same symbols and overlapping description shall be omitted. Also, dimensional proportions in the drawings do not necessarily match those of the description.

FIG. 1 is a diagram of a configuration of an embodiment of a wavelength-converted light generating apparatus according to the present invention. The present apparatus is a generating apparatus that uses excitation light of a predetermined wavelength and generates and outputs converted light of a shorter wavelength than the excitation light. Here, although in the following, examples where mainly the excitation light is near-infrared light and the converted light is visible light shall be described, the wavelength-converted light generating apparatus and generating method according to the present invention are not restricted to such wavelength bands. In the following, the configuration of the present wavelength-converted light generating apparatus 1A shall be described along with a wavelength-converted light generating method according to the present invention.

The wavelength-converted light generating apparatus 1A shown in FIG. 1 includes an excitation light source 10 and a wavelength conversion element 20. The wavelength conversion element 20 is an element used for wavelength conversion (frequency conversion) from excitation light to converted light and includes a holding substrate 21 and an aggregate 22 of crystals of a dye molecule. The dye molecule crystal aggregate (hereinafter, referred to simply as "crystal aggregate" at times) 22 is a wavelength conversion medium that actually performs the wavelength conversion of light in the element 20 and a plurality of dye molecule crystals (crystal grains) 23 are aggregated in a mutually proximate state. The holding substrate 21 is a crystal holding unit that holds the crystal aggregate 22. In the configuration of FIG. 1, the substrate 21 is disposed horizontally and the crystal aggregate 22 is held on one surface (upper surface in FIG. 1) of the substrate 21.

The near-infrared excitation light source 10 is installed as an excitation light supplying unit that supplies the excitation light of the predetermined wavelength to the wavelength conversion element 20. The excitation light source 10 emits and supplies to the wavelength conversion element 20, near-infrared light of a wavelength longer than an absorption edge of the dye molecule used in the crystal aggregate 22 of the wavelength conversion element 20 as the excitation light L0 (excitation light supplying step). In this process, by the wavelength of the excitation light L0 being longer in a wavelength than the absorption edge of the dye molecule as mentioned above, that is, being of a wavelength that is not absorbed by the dye molecule, even when the crystal aggregate 22 is irradiated with the excitation light L0, electron level excitation by a normal absorption process and an accompanying generation of luminescence do not occur in the dye molecule of the aggregate 22.

An excitation light supplying optical system is disposed between the excitation light source 10 and the wavelength conversion element 20. The supplying optical system in the present configuration example includes a wavelength selecting optical system 11 selecting, from among light emitted from the excitation light source 10, a wavelength component as the excitation light L0 with which the wavelength conversion element 20 is irradiated, and a light guiding optical system 16 guiding the excitation light L0 in a predetermined irradiation condition on the crystal aggregate 22 on the holding substrate 21.

Specifically, the wavelength selecting optical system 11 is configured with a long-pass filter 12 that transmits light of long wavelengths no less than a predetermined lower limit wavelength. The light guiding optical system 16 is configured with a converging lens 17 that convergingly irradiates the crystal aggregate 22 with the excitation light L0. A reflecting mirror 15 is disposed between the converging lens 17 and the wavelength conversion element 20. The near-infrared excitation light L0 that has passed through the wavelength selecting optical system 11 and the light guiding optical system 16 is changed in optical path by the reflecting mirror 15, and the crystal aggregate 22 of the element 20 is irradiated from obliquely above with the excitation light L0.

In the wavelength conversion element 20, by the near-infrared excitation light L0 being incident on the dye molecule crystal aggregate 22 held on the holding substrate 21, the converted light L1, which is visible light that has been wavelength-converted to a shorter wavelength than the excitation light L0, is generated and the converted light L1 is changed in optical path to a predetermined output optical path by a reflecting mirror 30 and thereafter output to an exterior as a visible light ray (wavelength conversion step). As shall be described below, such wavelength conversion of light from near-infrared light to visible light is performed by making use of properties of near-field light generated inside the crystal aggregate 22.

In the generating apparatus 1A shown in FIG. 1, a converted light output optical system is disposed for the converted light L1 output from the wavelength conversion element 20. The output optical system in the present configuration example includes a light guiding optical system 31 guiding the converted light L1, the output optical path of which is set by the reflecting mirror 30, to the exterior in predetermined output conditions and a wavelength selecting optical system 36 selecting, from among the generated converted light L1, a wavelength component to be output to the exterior.

Specifically, the light guiding optical system 31 is configured with converging lenses 32 and 33 that convergingly output the converted light L1 to the exterior. The wavelength selecting optical system 36 combines a long-pass filter 37 transmitting light no less than a predetermined lower limit wavelength and a short-pass filter 38 transmitting light no more than a predetermined upper limit wavelength to selectively output light of a wavelength band from the lower limit wavelength to the upper limit wavelength from among the converted light L1.

Effects of the wavelength-converted light generating apparatus and generating method according to the above-described embodiment shall now be described.

In the wavelength-converted light generating apparatus 1A shown in FIG. 1 and the generating method, the element, in which the crystal aggregate 22 of the plurality of dye molecule crystals 23 in a mutually proximate state is held by the holding substrate 21, is used as the wavelength conversion element 20. When the near-infrared excitation light L0, which is of a longer wavelength (lower energy) than the absorption edge of the dye molecule contained in the crystal aggregate 22 and with which electron level is not excited by a normal absorption process, is made incident on the wavelength conversion element 20, near-field light is generated near the surfaces of the dye molecule crystals 23 on which the excitation light L0 is made incident.

In this process, by a steep electric field gradient of the near-field light, a vibrational level is excited in the dye molecule inside the crystal located near the irradiated crystal and the visible converted light L1, including a component of a shorter wavelength (component of higher energy) than the excitation light L0, is generated. Thus, with the configuration where the dye molecule crystal aggregate 22 is used as the wavelength conversion medium, by use of the near-field light, wavelength conversion that generates the converted light L1, which is of a shorter wavelength than the excitation light L0 and is not generated by luminescence generation by electron level excitation in a normal absorption process, can be realized favorably.

With this configuration, because the excitation light that is longer in a wavelength than the absorption edge of the dye molecule is used, photodegradation of the dye molecule is unlikely to occur and degradation of the element is extremely low. Also, because the emission process utilizes the energy of the excitation light, decrease of emission intensity does not occur even when irradiation of the excitation light is continued. As shall be described below along with specific data, such an emission phenomenon is presumed to differ from conventionally known phenomena such as wavelength conversion by multiphoton absorption of the excitation light or nonlinear optical effect, and anti-Stokes shift in Raman scattering.

As a specific example of the dye molecule used in the crystal aggregate 22 that is the wavelength conversion medium in the wavelength conversion element 20, DCM (chemical name: 4-(dicyanomethylene)-2-methyl-6-(4-dimethylaminostyryl)-4H-pyrane; CAS No.: 51325-91-8) may be used. Rhodamine 6G (chemical name: Rhodamine 6G; CAS No.: 989-38-8) may also be used as the dye molecule. Various other dye molecules may be used as the wavelength conversion medium.

Figure 2:
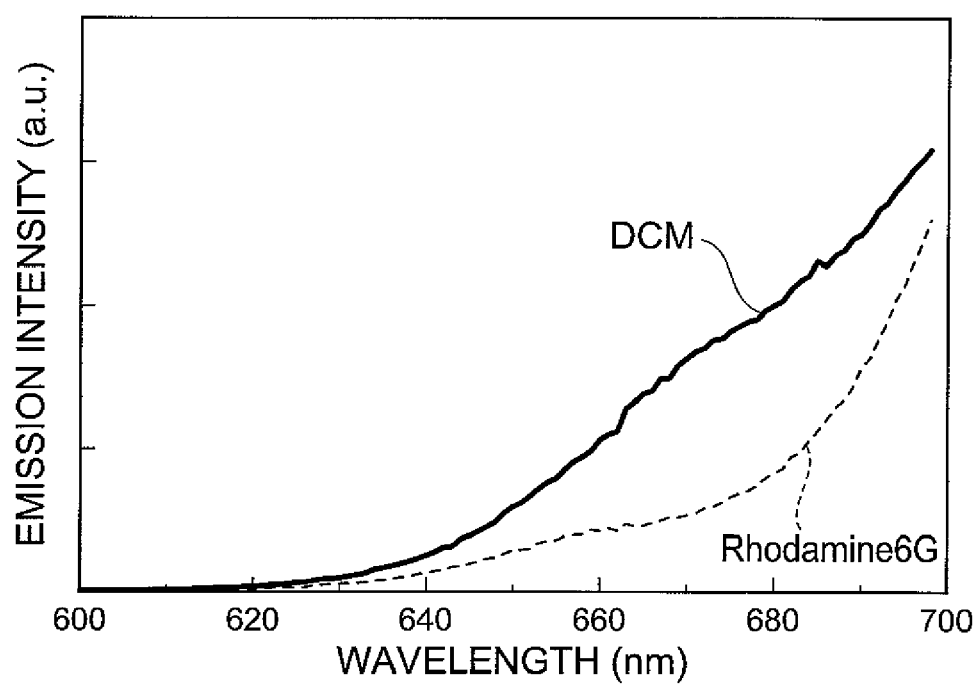
FIG. 2 is a graph of emission spectra of converted light generated by a wavelength conversion element.

FIG. 2 is a graph of emission spectra of the converted light L1 generated in the wavelength conversion element 20 by incidence of the excitation light L0. Here, a CW laser diode is used as the excitation light source 10, and emission spectra of the converted light L1 obtained by supplying the excitation light L0 of 1.27 W irradiation intensity and 808 nm wavelength to the wavelength conversion element 20 are shown. In the graph of FIG. 2, the horizontal axis indicates the wavelength (nm) of the converted light L1 and the vertical axis indicates the emission intensity (arbitrary units).

In FIG. 2, a solid line in the graph indicates the emission spectrum of the converted light L1 when DCM is used as the dye molecule and a dashed line in the graph indicates the emission spectrum of the converted light L1 when Rhodamine 6G is used. The emission spectra of this graph were measured using a configuration example (a) shown in FIG. 6 to be described below. As can be understood from this graph, by supplying the near-infrared excitation light L0 of 808 nm wavelength to the wavelength conversion element 20, the visible converted light L1 is generated in at least a wavelength range of 600 nm to 700 nm.

Here, in regard to the excitation light (incident light) and the converted light (output light), a configuration where near-infrared light is used as the excitation light L0 and the converted light L1 is visible light as in the above-described example may be used. In this case, in regard to the specific wavelength bands of the excitation light L0 and the converted light L1, preferably the excitation light L0 is near-infrared light having a wavelength in a range of 750 nm to 2 μm, and the converted light L1 is visible light having a wavelength in a range of 400 nm to 750 nm. The wavelength conversion of utilizing near-infrared light as the excitation light and generating visible light of a shorter wavelength than the near-infrared light can thereby be realized favorably.

In regard to the dye molecule of the crystal aggregate 22 that functions as the wavelength conversion medium in the wavelength conversion element 20, the dye molecule crystals 23 contained in the crystal aggregate 22 are preferably crystal grains having a shape with a width no more than 1 μm and a length of no more than 10 μm. With this configuration, generation efficiency of the converted light L1 by wavelength conversion utilizing the near-field light generated near the surfaces of the dye molecule crystals 23 on which the excitation light L0 is made incident can be improved.

Figure 3:
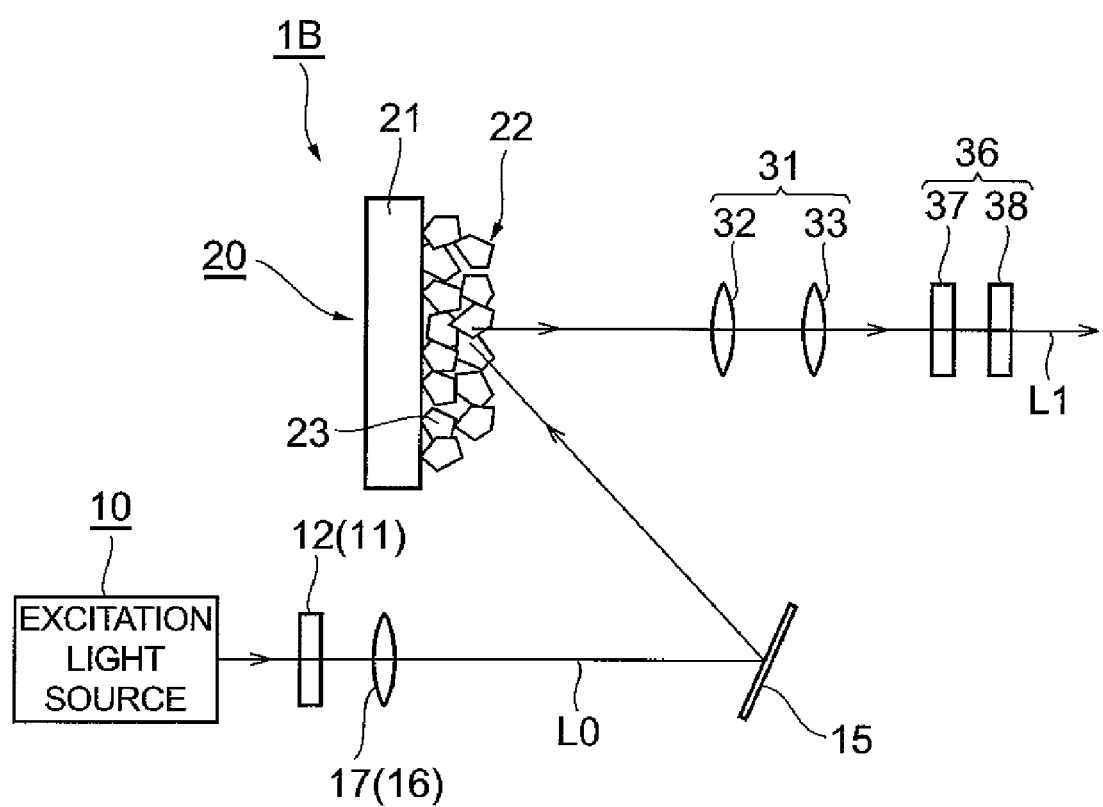
FIG. 3 is a diagram of a configuration of another embodiment of a wavelength-converted light generating apparatus.

In regard to the configuration of the wavelength-converted light generating apparatus, specifically, various configurations besides the configuration shown in FIG. 1 may be used. FIG. 3 is a diagram of a configuration of another embodiment of a wavelength-converted light generating apparatus. In regard to the excitation light source 10, the wavelength selecting optical system 11, the light guiding optical system 16, the light guiding optical system 31, and the wavelength selecting optical system 36, the wavelength-converted light generating apparatus 1B shown in FIG. 3 is the same in configuration as the generating apparatus 1A shown in FIG. 1.

As in FIG. 1, the wavelength conversion element 20 is configured with the holding substrate 21 and the dye molecule crystal aggregate 22. In the configuration of FIG. 3, the substrate 21 is positioned vertically and the crystal aggregate 22 is held on one surface (the right surface in FIG. 3) of the substrate 21. The reflecting mirror 15 is disposed in the excitation light supplying optical system, and the excitation light L0 that has passed through the wavelength selecting optical system 11 and the light guiding optical system 16 is made incident on the crystal aggregate 22 of the element 20 via the reflecting mirror 15. Also, with the present configuration example, the reflecting mirror 30 is not disposed in the converted light output optical system. The setup configuration of the wavelength conversion element 20 can thus be modified variously along with the configurations of the optical systems.

In regard to the configuration of the wavelength conversion element 20, preferably the substrate (member of substrate form) 21 is used as the crystal holding unit and the dye molecule crystal aggregate 22 is held on one surface of the substrate 21 as shown in FIGS. 1 and 3. The element 20 having the crystal aggregate 22 as the wavelength conversion medium can thereby be configured favorably. In regard to the specific configuration of the wavelength conversion element 20, various configurations may be used as shown in FIGS. 4 to 8. In FIGS. 4 to 8 below, illustration of the dye molecule crystal aggregate is simplified.

Figure 4:
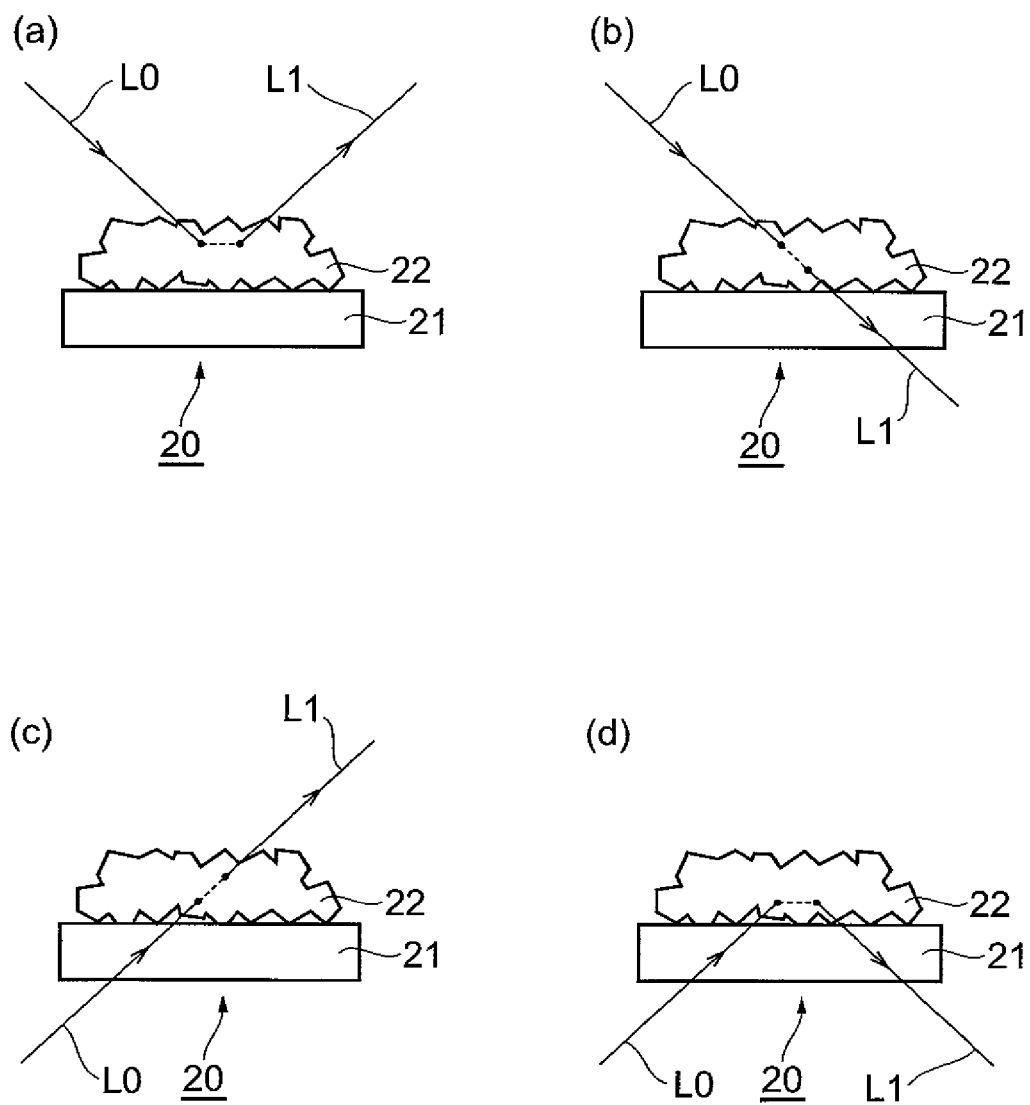
FIG. 4 shows diagrams of configuration examples of the wavelength conversion element.

FIG. 4 shows diagrams of configuration examples of the wavelength conversion element 20 using the holding substrate 21 as the crystal holding unit. In the configuration example (a) in FIG. 4, the crystal aggregate 22 held on the substrate 21 is irradiated with the excitation light L0 from above and the converted light L1 obtained is likewise output upward as in the configuration shown in FIGS. 1 and 3. In the configuration example (b) in FIG. 4, the crystal aggregate 22 held on the substrate 21 is irradiated with the excitation light L0 from above and the converted light L1 obtained is output downward. In this case, a substrate made of a material that transmits the visible converted light L1 must be used as the substrate 21.

In the configuration example (c) in FIG. 4, the crystal aggregate 22 held on the substrate 21 is irradiated with the excitation light L0 from below and the converted light L1 obtained is output upward. In this case, a substrate made of a material that transmits the near-infrared excitation light L0 must be used as the substrate 21. In the configuration example (d) in FIG. 4, the crystal aggregate 22 held on the substrate 21 is irradiated with the excitation light L0 from below and the converted light L1 obtained is likewise output downward. In this case, a substrate made of a material that transmits both the near-infrared excitation light L0 and the visible converted light L1 must be used as the substrate 21.

Figure 5:
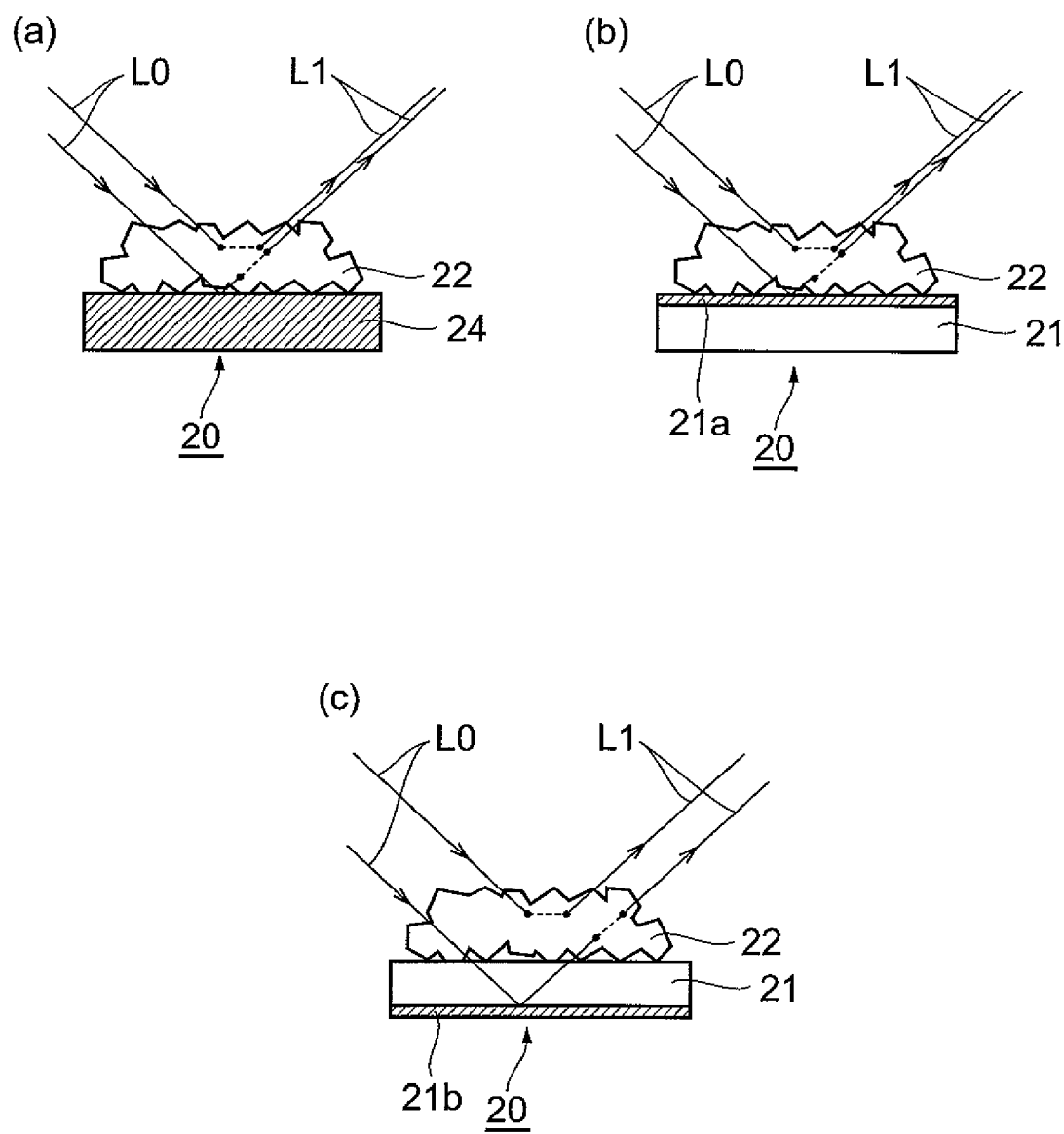
FIG. 5 shows diagrams of configuration examples of the wavelength conversion element.

FIG. 5 shows diagrams of configuration examples of the wavelength conversion element 20 in which a holding substrate is used as the crystal holding unit and the holding substrate includes a reflecting unit that reflects the excitation light L0. By thus making the holding substrate have the function of the reflecting unit for the excitation light L0, the excitation light L0 that has passed through the crystal aggregate 22 without undergoing wavelength conversion can be reflected by the holding substrate and made incident on the crystal aggregate 22 again. Utilization efficiency of the excitation light L0 in the wavelength conversion element 20 can thereby be improved.

In the configuration example (a) in FIG. 5, a holding substrate 24 including a reflecting member of substrate form that reflects the excitation light L0 is used as the holding substrate. In this case, the excitation light L0 with which the crystal aggregate 22 is irradiated from above is reflected at an upper surface of the substrate 24. The configuration example (b) in FIG. 5 uses, as the holding substrate, the holding substrate 21 having a reflective film 21a formed on an upper surface side on which the crystal aggregate 22 is held. In this case, the excitation light L0 is reflected at the reflective film 21a on the upper surface side of the substrate 21.

The configuration example (c) in FIG. 5 uses, as the holding substrate, the holding substrate 21 having a reflective film 21b formed on a lower surface side opposite the side on which the crystal aggregate 22 is held. In this case, the excitation light L0 is transmitted through the holding substrate 21 and thereafter reflected at the reflective film 21b on the lower surface side of the substrate 21. With this configuration, a substrate made of a material that transmits the excitation light L0 must be used as the substrate 21.

Figure 6:
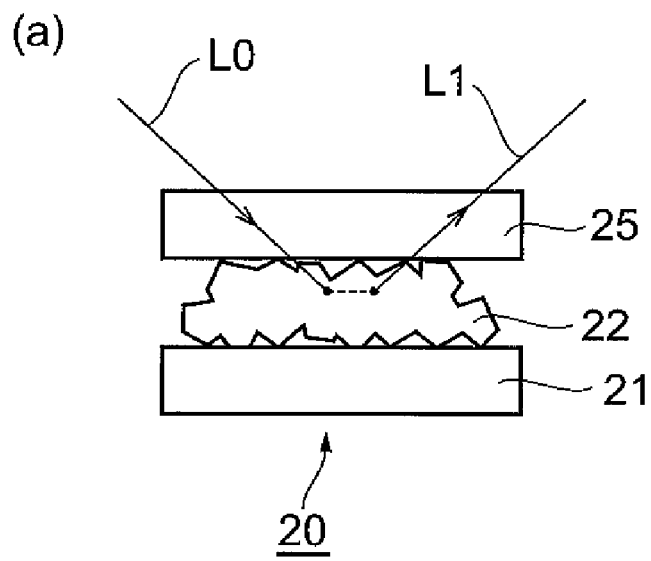
FIG. 6 shows diagrams of configuration examples of the wavelength conversion element.
Figure 6:
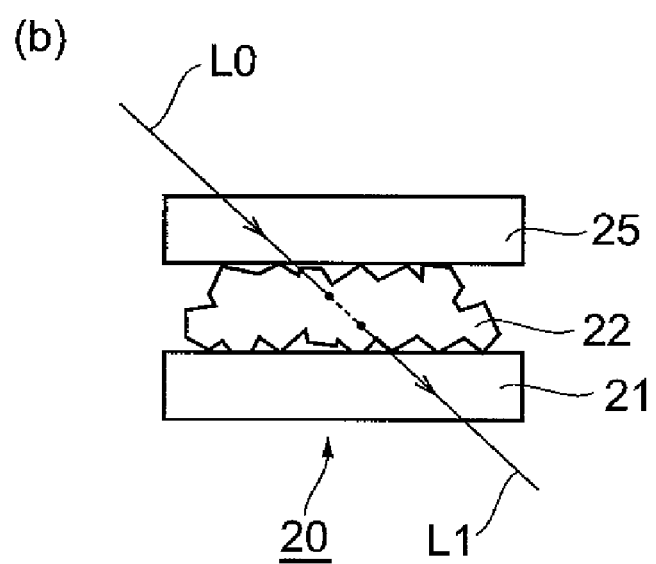
Figure 7:
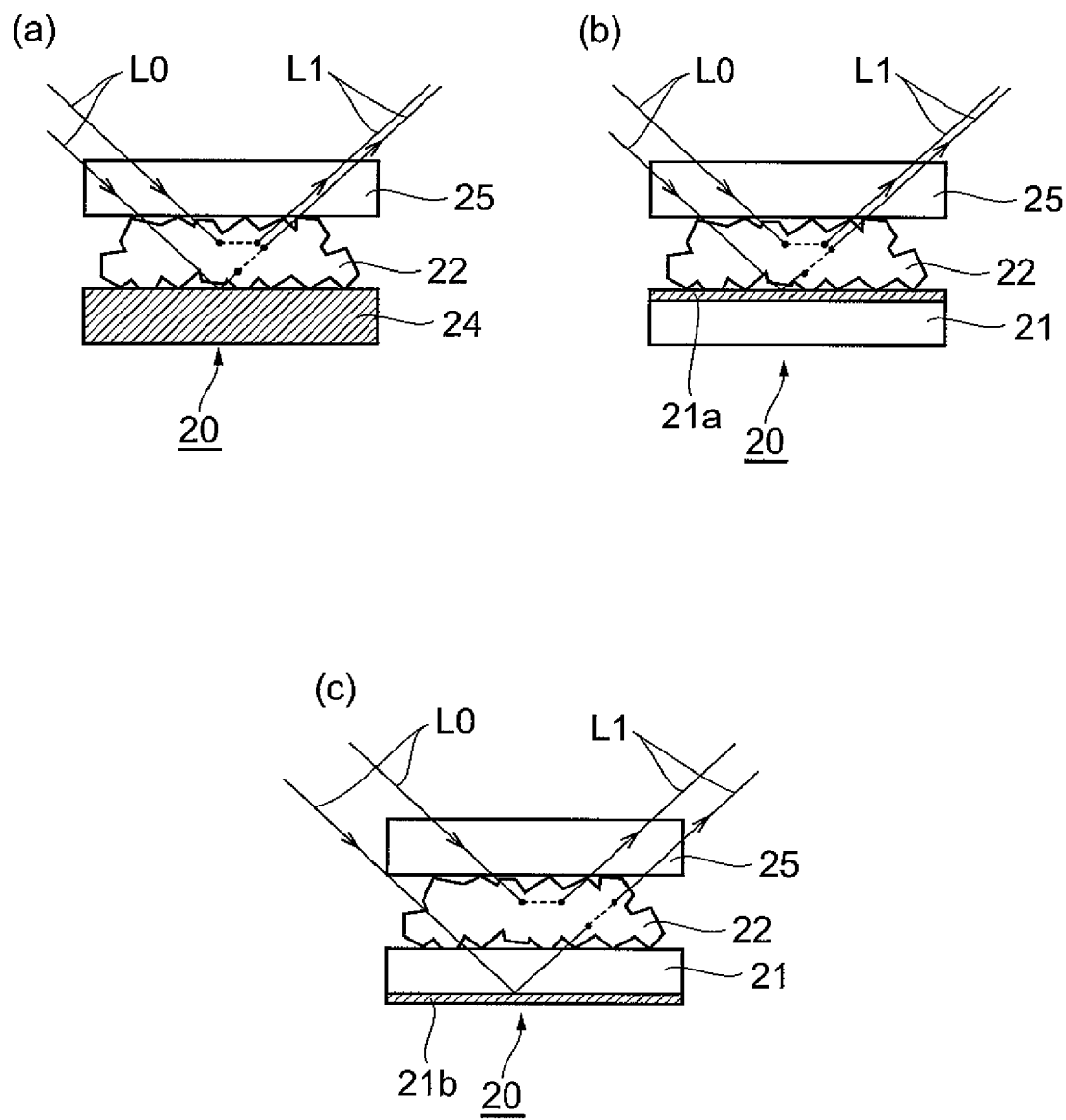
FIG. 7 shows diagrams of configuration examples of the wavelength conversion element.

FIGS. 6 and 7 show configuration examples of the wavelength conversion element 20 in which two holding substrates that sandwichingly hold the crystal aggregate 22 are used as the crystal holding unit. Such a configuration is effective in terms of physically protecting the crystal aggregate 22. In the configuration example (a) in FIG. 6, the crystal aggregate 22 is held on the holding substrate 21 and a holding substrate 25, which, together with the substrate 21, sandwiches and holds the crystal aggregate 22, is disposed further above. In the present configuration example, the crystal aggregate 22 is irradiated with the excitation light L0 from above and the converted light L1 obtained is likewise output upward. In this case, a substrate made of a material that transmits both the excitation light L0 and the converted light L1 must be used as the substrate 25.

In the configuration example (b) in FIG. 6, although the configuration of the holding substrates 21 and 25 is the same as that of the configuration example (a) in FIG. 6, the crystal aggregate 22 is irradiated with the excitation light L0 from above and the converted light L1 obtained is output downward. In this case, a substrate made of a material that transmits the excitation light L0 must be used as the upper substrate 25 and a substrate made of a material that transmits the converted light L1 must be used as the lower substrate 21.

In the configuration examples (a) to (c) in FIG. 7, the configuration of using two holding substrates is applied to the configuration examples (a) to (c) in FIG. 5. In the configuration example (a) in FIG. 7, the crystal aggregate 22 is held on the substrate 24 made of the reflecting member, and the substrate 25 is disposed further above. In the configuration example (b) in FIG. 7, the crystal aggregate 22 is held on the substrate 21 having the reflective film 21a formed on the upper surface side, and the substrate 25 is disposed further above. In the configuration example (c) in FIG. 7, the crystal aggregate 22 is held on the substrate 21 having the reflective film 21b formed on the lower surface side, and the substrate 25 is disposed further above. In these configurations, a substrate made of a material that transmits both the excitation light L0 and the converted light L1 must be used as the substrate 25.

Figure 8:
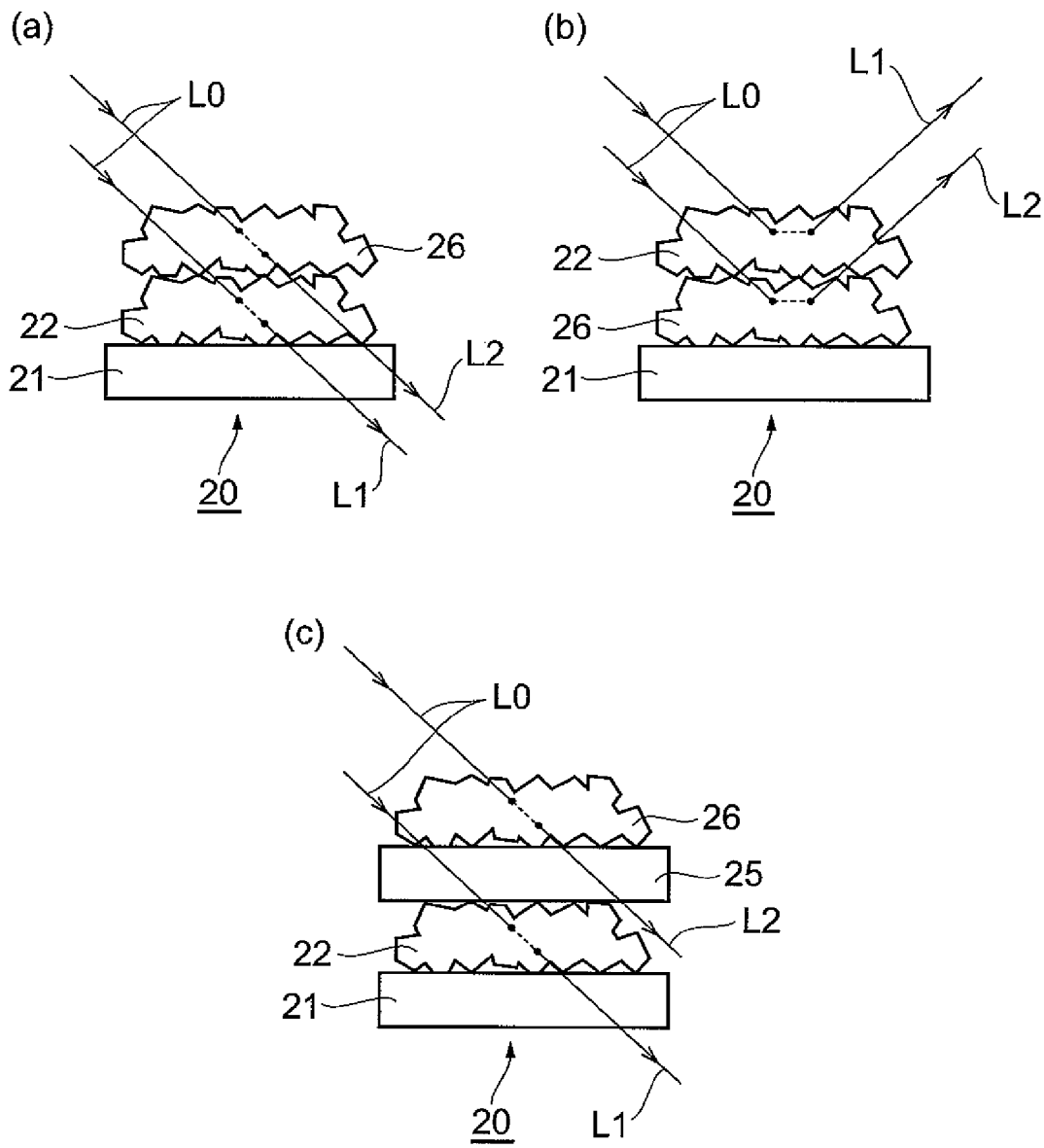
FIG. 8 shows diagrams of configuration examples of the wavelength conversion element.

FIG. 8 shows configuration examples of the wavelength conversion element 20 that use crystal aggregates of two types of dye molecules as the crystal aggregates of the wavelength conversion medium. In the configuration example (a) in FIG. 8, a first dye molecule crystal aggregate 22 is held on the substrate 21 and a second dye molecule crystal aggregate 26 is held further above. In the present configuration example, the crystal aggregates 22 and 26 are irradiated with the excitation light L0 from above and converted lights L1 and L2 obtained by the respective crystal aggregates are output downward.

With this configuration, by the excitation light L0 passed through the upper crystal aggregate 26 and made incident on the lower crystal aggregate 22, the converted light L1 having a first emission spectrum (first emission wavelength) is generated in the aggregate 22, and this converted light L1 is output via the substrate 21. By the excitation light L0 made incident on the upper crystal aggregate 26, the converted light L2 having a second emission spectrum (second emission wavelength) that differs from the first emission spectrum is generated in the aggregate 26, and this converted light L2 is output via the crystal aggregate 22 and the substrate 21. In this case, a substrate made of a material that transmits the converted lights L1 and L2 must be used as the substrate 21. Also preferably, a crystal aggregate of a dye molecule that does not absorb the converted light L2 generated at the upper crystal aggregate 26 is used as the lower crystal aggregate 22.

In the configuration example (b) in FIG. 8, the second dye molecule crystal aggregate 26 is held on the substrate 21 and the first dye molecule crystal aggregate 22 is held further above. In the present configuration example, the crystal aggregates 26 and 22 are irradiated with the excitation light L0 from above and the converted lights L2 and L1 obtained from the respective crystal aggregates are likewise output upward.

With this configuration, by the excitation light L0 made incident on the upper crystal aggregate 22, the converted light L1 having the first emission spectrum is generated in the aggregate 22, and this converted light L1 is output. By the excitation light L0 passed through the upper crystal aggregate 22 and made incident on the lower crystal aggregate 26, the converted light L2 having the second emission spectrum is generated in the aggregate 26, and this converted light L2 is output via the crystal aggregate 22. Preferably in this case, a crystal aggregate of a dye molecule that does not absorb the converted light L2 generated at the lower crystal aggregate 26 is used as the upper crystal aggregate 22.

In the configuration example (c) in FIG. 8, the first dye molecule crystal aggregate 22 is held on the substrate 21, the substrate 25 is disposed thereabove, and the second dye molecule crystal aggregate 26 is held further above. In the present configuration example, the crystal aggregates 22 and 26 are irradiated with the excitation light L0 from above and the converted lights L1 and L2 obtained by the respective crystal aggregates are output downward.

With this configuration, by the excitation light L0 passed through the upper crystal aggregate 26 and the substrate 25 and made incident on the lower crystal aggregate 22, the converted light L1 having the first emission spectrum is generated in the aggregate 22, and this converted light L1 is output via the substrate 21. By the excitation light L0 made incident on the upper crystal aggregate 26, the converted light L2 having the second emission spectrum is generated in the aggregate 26, and this converted light L2 is output via the substrate 25, the crystal aggregate 22, and the substrate 21. In this case, a substrate made of a material that transmits the converted lights L1 and L2 must be used as the substrate 21, and a substrate made of a material that transmits the excitation light L0 and the converted light L2 must be used as the substrate 25. Also preferably, a crystal aggregate of a dye molecule that does not absorb the converted light L2 generated at the upper crystal aggregate 26 is used as the lower crystal aggregate 22.

By thus using crystal aggregates of a plurality of types of dye molecules as wavelength conversion media in the wavelength conversion element 20, converted light having various emission spectra can be generated with respect to the incidence of the excitation light L0. Also with this configuration, the utilization efficiency of the excitation light L0 can be improved. Although in regard to the dye molecule, configurations using two types of dye molecules were described above with the configuration examples, three or more types of dye molecules may be used instead.

Figure 9:
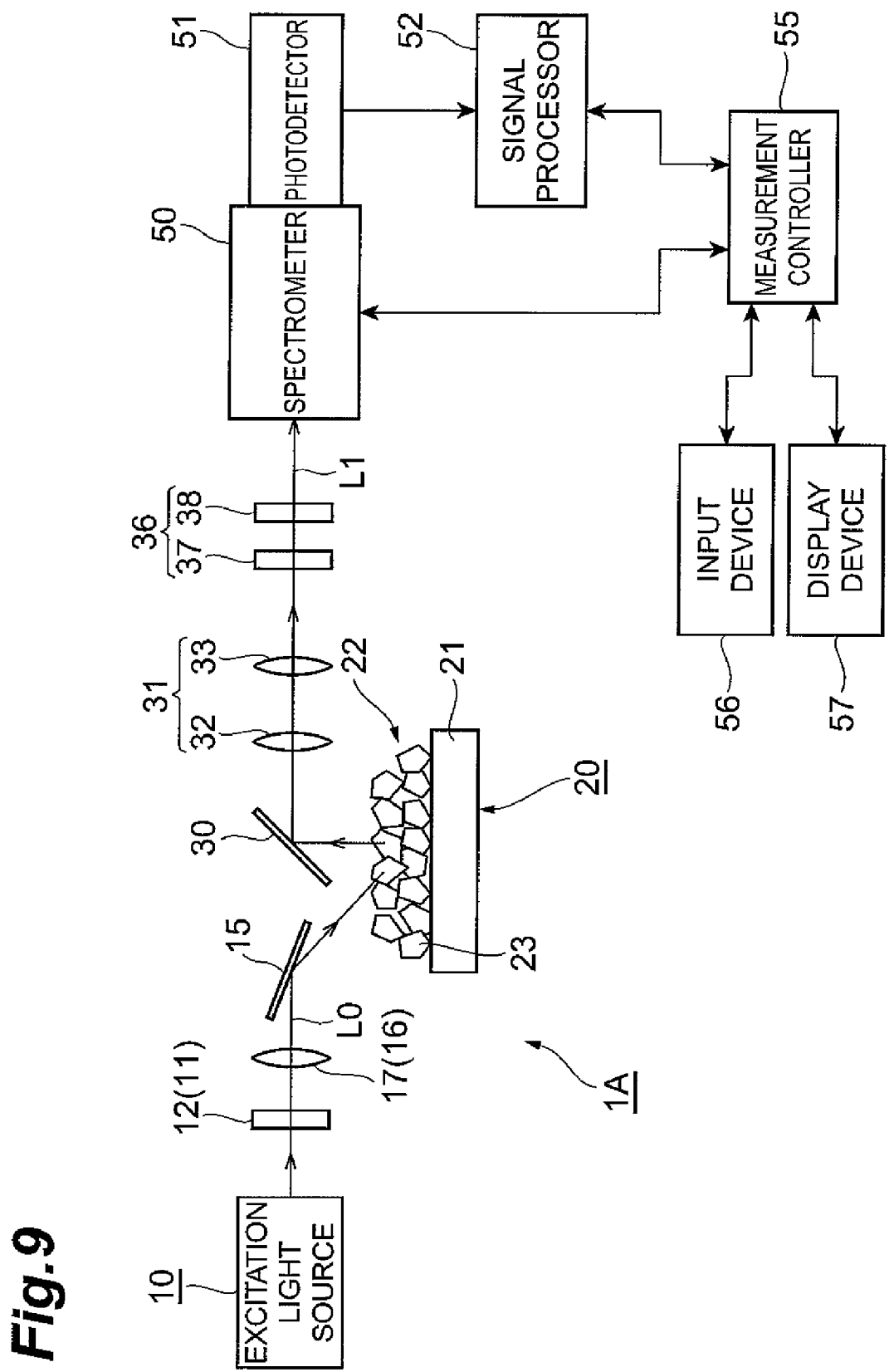
FIG. 9 is a diagram of a configuration of a converted light measuring system including a wavelength-converted light generating apparatus.

The wavelength-converted light generating apparatus 1A shown in FIG. 1 shall now be described further along with specific data. FIG. 9 is a diagram of a configuration of a converted light measuring system including a wavelength-converted light generating apparatus. In the present measuring system, the configuration of the wavelength-converted light generating apparatus 1A is basically the same as the configuration shown in FIG. 1.

In regard to the specific configuration of the generating apparatus 1A in the measuring system of FIG. 9, a long-pass filter transmitting light of a wavelength no less than 720 nm is used as the filter 12, and a converging lens with a focal length of 100 mm is used as the lens 17 in the excitation light supplying optical system. In the converted light output optical system, converging lenses with focal lengths of 50 mm and 200 mm are used as the lenses 32 and 33, respectively, a long-pass filter transmitting light of a wavelength no less than 550 nm is used as the filter 37, and a short-pass filter transmitting light of a wavelength no more than 700 nm is used as the filter 38.

A CW oscillation titanium-sapphire laser or a semiconductor laser was used as the near-infrared excitation light source 10 that supplies the excitation light L0. The titanium-sapphire laser is a laser light source that can be varied in oscillation wavelength. In measurements, three types of excitation light of 753 nm, 780 nm, and 805 nm wavelengths were used as the excitation light supplied from the titanium-sapphire laser. As the excitation light supplied from the semiconductor laser, excitation light of 808 nm wavelength was used. In regard to the irradiation intensity of the excitation light L0 irradiating the wavelength conversion element 20, the irradiation intensity was set in a range of 2.2 mW to 1270 mW by use of a neutral density filter or adjustment of an injection current. At a position of irradiation on the wavelength conversion element 20, a convergence size of the excitation light L0 is approximately 5 mm$\phi$.

In regard to the wavelength conversion element 20, a synthetic quartz substrate with a thickness of 1 mm or a synthetic quartz cell with an optical path length of 1 mm was used as the substrate of the crystal holding unit. In a case of using a substrate, on which a reflective film is formed, as the crystal holding unit, a quartz substrate, on which a Cr reflective thin film with a thickness of 50 nm was formed by vapor deposition, was used. In regard to the dye molecule crystal aggregate 22, the abovementioned DCM or Rhodamine 6G was used as the dye molecule.

With respect to the wavelength-converted light generating apparatus 1A with the above configuration, a spectrometer 50, a photodetector 51, a signal processor 52, and a measurement controller 55 are installed in the measuring system shown in FIG. 9. Also with the configuration of FIG. 9, an input device 56 for input of instructions and information necessary for measurement and a display device 57 for display of measurement conditions, measurement results, and other information are connected to the measurement controller 55. In this configuration, the converted light L1 generated at the wavelength conversion element 20 and output via the converted light output optical system is spectrally dispersed by the spectrometer 50. A wavelength component of the converted light L1 taken out by the spectrometer 50 is detected by the photodetector 51 and an electrical signal that is in accordance with a detected light amount is thereby generated.

A photomultiplier (H7421-40, manufactured by Hamamatsu Photonics K. K.) was used as the photodetector 51 and the converted light L1 was measured by a spectrometric photon counting method using the spectrometer 50 described above. Such a photodetector 51 has a function of outputting, by a built-in electrical circuit, one electrical pulse signal at a time in correspondence to each single detected photon.

Counting of the electrical pulse signals output within a fixed time from the photodetector 51 was performed by the signal processor 52, and control of measurement, analysis, recording of data, etc., were performed upon taking information on the number of electrical pulse signals obtained (number of photons detected), information on a spectrally dispersed wavelength at the spectrometer 50, and other necessary information into the measurement controller 55 configured with a computer. As the signal processor 52 for counting the electrical pulse signal, a multifunction generator, WF1973, manufactured by NF Corp. and a universal counter, SC-7205, manufactured by Iwatsu Test Instruments Corp., were used in combination.

In regard to the wavelength conversion element 20 using DCM or Rhodamine 6G, the element was prepared by either of the following two methods. In a first preparation method, first, ethanol of a supersaturation quantity is added to the dye molecule. The quantity in this case is, for example, 1 cc of ethanol with respect to 22 mg of DCM. Or, the quantity is 1 cc of ethanol with respect to 36 mg of Rhodamine 6G. In a container containing such a solution, the solution is stirred using an ultrasonic cleaner, etc., to disperse the dye molecule in the ethanol solution. The solution is then dripped onto the quartz substrate or into the quartz cell used as the crystal holding unit and the ethanol is dried. The wavelength conversion element 20, with which the dye molecule crystal aggregate is held by the holding unit, is thereby obtained.

In a second preparation method, DCM is used as the dye molecule, and DCM is completely dissolved in acetone. The quantity of solution in this case is, for example, 1 cc of acetone with respect to 12 mg of DCM. When 1 cc of such a solution is mixed with 0.5 cc of water, the DCM dye molecule crystallizes and precipitates. By then dripping the precipitated dye molecule crystals onto the quartz substrate or into the quartz cell used as the crystal holding unit, the wavelength conversion element 20, in which the DCM crystal aggregate is held by the holding unit, is obtained.

By using the wavelength conversion element 20, the wavelength-converted light generating apparatus 1A, and the converted light measuring system of the above configurations, characteristics of the converted light L1 generated at the wavelength conversion element 20 by incidence of the excitation light L0 were measured. As a result, measurement data were obtained indicating that the emission phenomenon (wavelength conversion phenomenon) observed in the wavelength conversion element 20 using the dye molecule crystal aggregate differs from conventionally known phenomena such as wavelength conversion by multiphoton absorption of the excitation light or by nonlinear optical effect, and anti-Stokes shift in Raman scattering. The measurement results obtained, the characteristics of the converted light L1, etc., shall now be described.

(First Measurement)

In a first measurement, the semiconductor laser was used as the excitation light source 10 and the laser light of the oscillation wavelength of 808 nm was used as the excitation light. In regard to the wavelength conversion element 20, the wavelength conversion element using the quartz cell as the crystal holding unit, using DCM as the dye molecule, and prepared by the first preparation method was used as a measurement sample. In regard to specific measurement details, measurements were made upon varying the excitation light intensity by using neutral density filters to adjust the irradiation intensity on the wavelength conversion element 20 of the excitation light L0 supplied from the near-infrared excitation light source 10.

Figure 10:
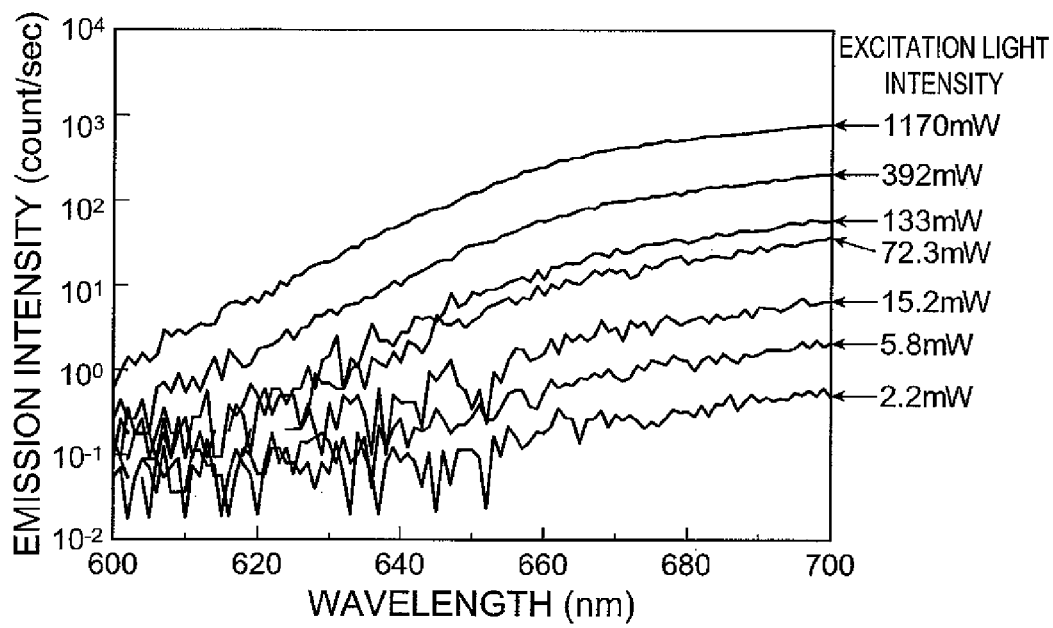
FIG. 10 shows graphs showing excitation light intensity dependence of emission intensity of converted light.
Figure 10:
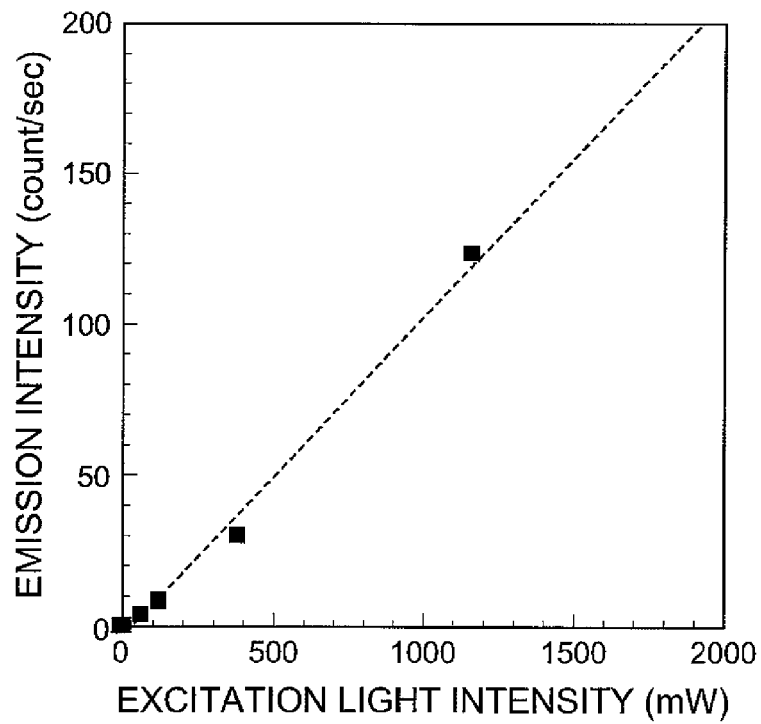

FIG. 10 shows graphs showing excitation light intensity dependence of the emission intensity of the converted light generated in the wavelength conversion element 20. In the graph (a) in FIG. 10, the horizontal axis indicates the wavelength (nm) of the converted light L1 and the vertical axis indicates the emission intensity (counts/sec). The graph (a) in FIG. 10 shows emission spectra of the converted light L1 obtained in respective cases of setting the excitation light intensity to 2.2 mW, 5.8 mW, 15.2 mW, 72.3 mW, 133 mW, 392 mW, and 1170 mW.

The graph (b) in FIG. 10 shows the excitation light intensity dependence of the emission intensity of a wavelength component of 650 nm wavelength in the converted light L1. In the graph (b) in FIG. 10, the horizontal axis indicates the excitation light intensity (mW) and the vertical axis indicates the emission intensity (counts/sec) of the converted light of 650 nm wavelength.

From the graphs (a) and (b) in FIG. 10, it can be understood that with the wavelength-converted light generating apparatus 1A of the above-described configuration, the emission intensity of the converted light L1 obtained varies linearly with the irradiation intensity of the excitation light L0. The emission phenomenon in the present generating apparatus 1A thus has characteristics that differ from those of emission phenomena due to nonlinear optical phenomena. In this case, an infrared pulse light source of high peak power, etc., is not required as the excitation light source, for example, as in wavelength conversion using second harmonic generation, and wavelength conversion (up-conversion) to visible light can be realized even by using continuous operation (CW operation) excitation light.

(Second Measurement)

In a second measurement, the titanium-sapphire laser was used as the excitation light source 10 and laser light of 1000 mW intensity and 805 nm oscillation wavelength was used as the excitation light. In regard to the wavelength conversion element 20, the wavelength conversion element using the quartz substrate as the crystal holding unit, using DCM as the dye molecule, and prepared by the first preparation method was used as the measurement sample. Also, in addition to the measurement of converted light generation using the excitation light of 805 nm wavelength as described above, luminescence generation using excitation light of 532 nm wavelength was also measured, and the measurement results were compared.

Figure 11:
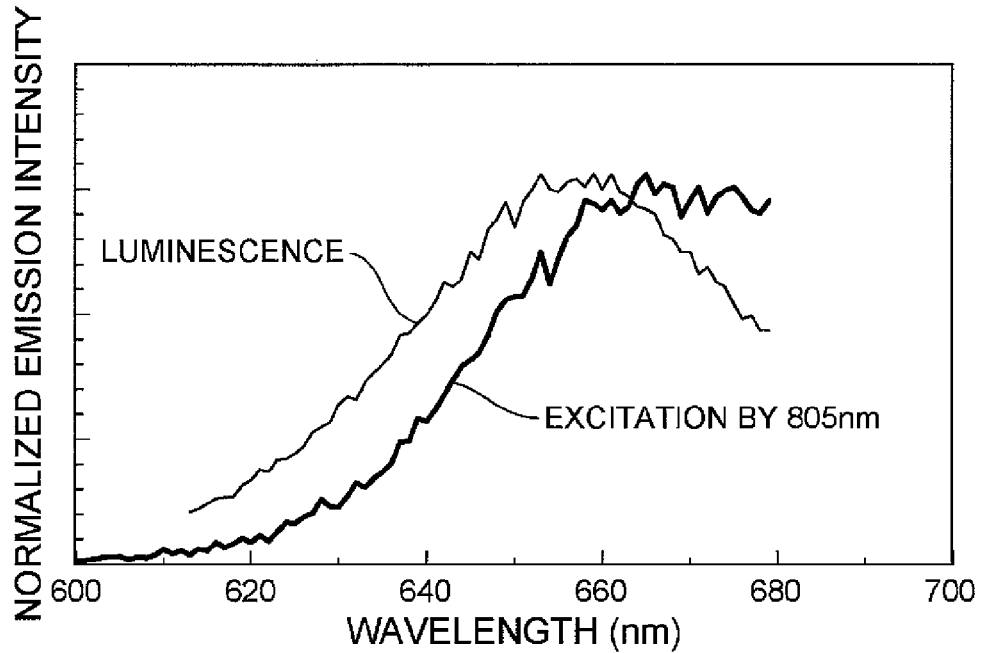
FIG. 11 shows graphs of emission spectra of converted light.
Figure 11:
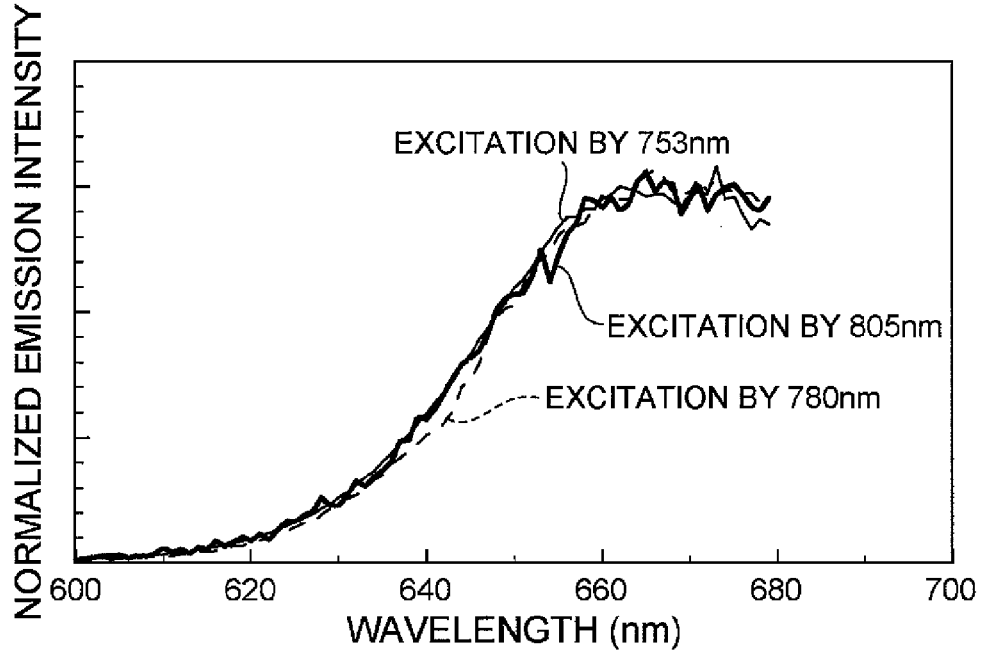

The graph (a) in FIG. 11 is a graph of emission spectra of the converted light generated in the wavelength conversion element 20, with the horizontal axis indicating the wavelength (nm) of the converted light L1 and the vertical axis indicating the emission intensity normalized by a peak value of each spectrum. The graph (a) in FIG. 11 shows the emission spectrum of the converted light in the case of using the excitation light of 805 nm wavelength and the emission spectrum of luminescence in the case of using the excitation light of 532 nm wavelength. As can be understood from these emission spectra, the visible converted light L1 generated from the near-infrared excitation light L0 and making use of the near-field light in the wavelength conversion element 20 differs in emission spectrum from the luminescence due to electron level excitation.

(Third Measurement)

In a third measurement, the titanium-sapphire laser was used as the excitation light source 10 and the laser light of 1000 mW intensity was used as the excitation light. In regard to the wavelength conversion element 20, the wavelength conversion element using the quartz substrate as the crystal holding unit, using DCM as the dye molecule, and prepared by the first preparation method was used as the measurement sample. Also, the wavelength of the excitation light was varyingly set at 753 nm, 780 nm, and 805 nm and measurement of the converted light was performed at each wavelength.

As with the graph (a), the graph (b) in FIG. 11 is a graph of emission spectra of the converted light generated in the wavelength conversion element 20. The graph (b) in FIG. 11 shows the emission spectra of the converted light obtained with each of the excitation lights of 753 nm, 780 nm, and 805 nm wavelength. As can be understood from these emission spectra, the emission spectrum of the converted light L1 generated in the wavelength conversion element 20 does not change in shape even when the wavelength of the excitation light L0 is changed.

From the above results of the first to third measurements, it is presumed that the wavelength conversion phenomenon from near-infrared light to visible light that occurs in the wavelength conversion element 20 of the above-described configuration differs from conventionally known phenomena. As a basic principle of emission, it is considered as mentioned above that by the steep electric field gradient of the near-field light generated near the surfaces of the dye molecule crystals 23 on which the excitation light L0 is made incident, a vibrational level is excited in the dye molecule inside the crystal located near the irradiated crystal and the converted light L1 of a shorter wavelength than the excitation light L0 is generated.

(Fourth Measurement)

In a fourth measurement, the semiconductor laser was used as the excitation light source 10 and laser light of 808 nm oscillation wavelength and 1270 mW intensity was used as the excitation light. In regard to the wavelength conversion element 20, the wavelength conversion element using DCM as the dye molecule and prepared by the first preparation method was used as the measurement sample. Measurement of the converted light was performed for each of cases of using, as the crystal holding unit, the quartz substrate and a holding substrate having a Cr reflective film of 50 nm thickness formed by vapor deposition on the upper surface being the crystal aggregate side of the quartz substrate.

Figure 12:
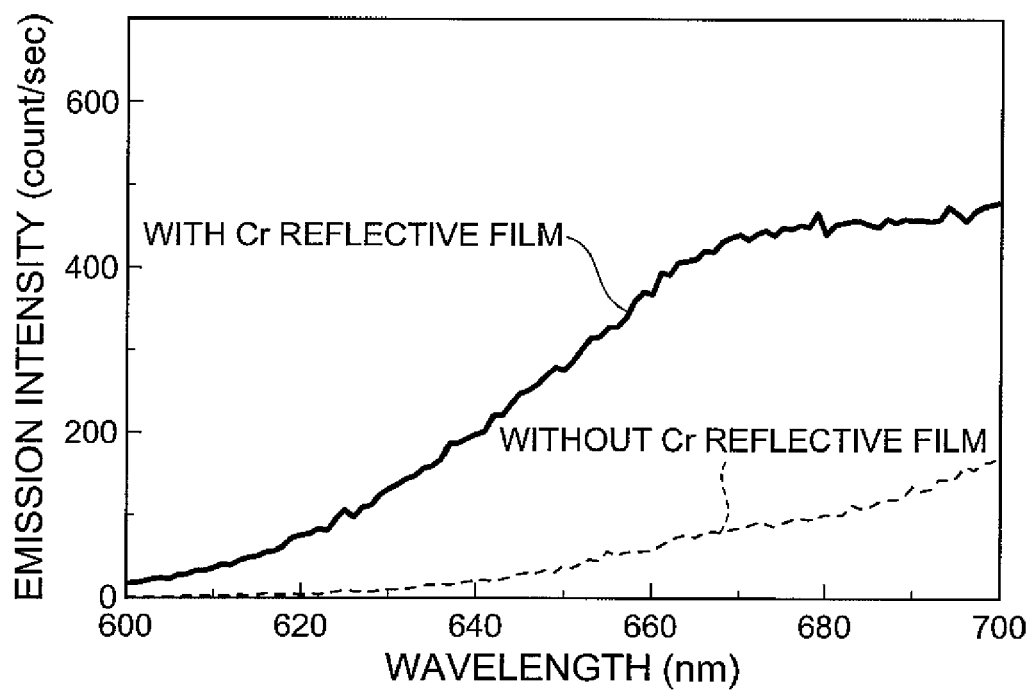
FIG. 12 is a graph showing variation of an emission spectrum of converted light due to a reflective film.

FIG. 12 is a graph showing variation, due to the reflective film, of an emission spectrum of the converted light generated in the wavelength conversion element 20, with the horizontal axis indicating the wavelength (nm) of the converted light L1 and the vertical axis indicating the emission intensity (counts/sec) of the converted light. In FIG. 12, a solid line in the graph indicates the emission spectrum of the converted light L1 in the case of using the substrate with the Cr reflective film, and a dashed line in the graph indicates the emission spectrum of the converted light L1 in the case of using the substrate without the Cr reflective film. As can be understood from these emission spectra, by using, in the wavelength conversion element 20, the crystal holding unit including the Cr reflective film or other reflecting unit, the utilization efficiency of the excitation light in the wavelength conversion can be improved and the emission intensity of the converted light can be increased.

(Fifth Measurement)

In a fifth measurement, the semiconductor laser was used as the excitation light source 10 and laser light of 808 nm oscillation wavelength and 260 mW intensity was used as the excitation light. In regard to the wavelength conversion element 20, the wavelength conversion element using the quartz cell as the crystal holding unit and using DCM as the dye molecule was used as the measurement sample. In regard to the crystal aggregate 22 of the wavelength conversion element 20, measurement of the converted light was performed using each of crystal aggregates respectively prepared by the first preparation method and the second preparation method.

Figure 13:
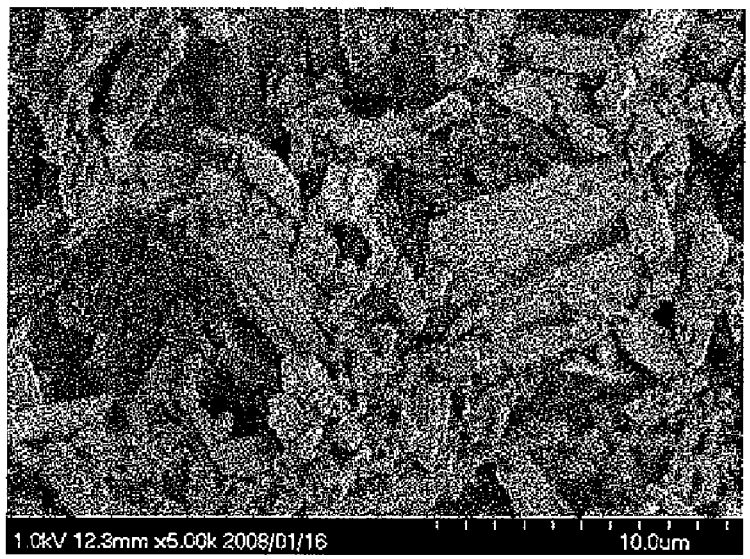
FIG. 13 shows SEM images of examples of dye molecule crystal aggregates.
Figure 13:
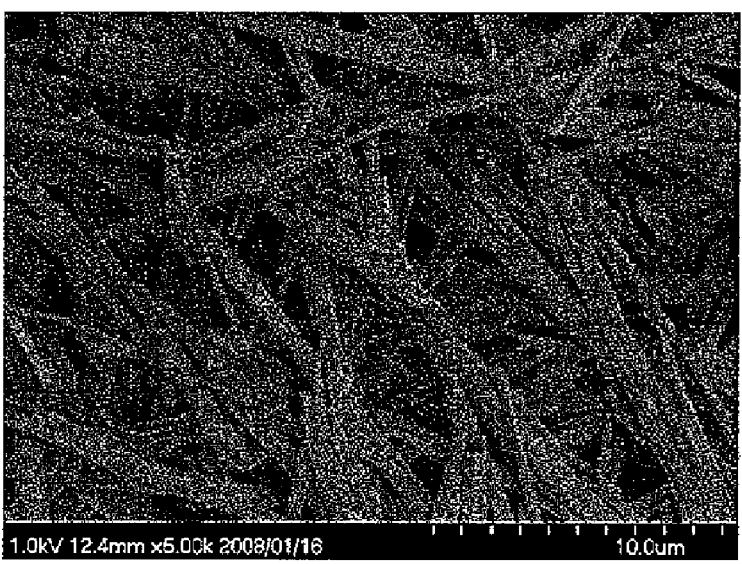

FIG. 13 shows SEM images of the examples of the dye molecule crystal aggregates, with image (a) in FIG. 13 showing a shape of the crystals in the crystal aggregate prepared by the first preparation method (shape A), and image (b) in FIG. 13 showing a shape of the crystals in the crystal aggregate prepared by the second preparation method (shape B). As shown in these images, with the crystal shape A in the case of using the first preparation method, the dye molecule crystals are crystal grains with a size of one side being approximately 1 μm. Meanwhile, with the crystal shape B in the case of using the second preparation method, the dye molecule crystals are crystals of an elongate shape with a width of approximately 1 μm and a length in a longitudinal direction of approximately 10 μm.

Figure 14:
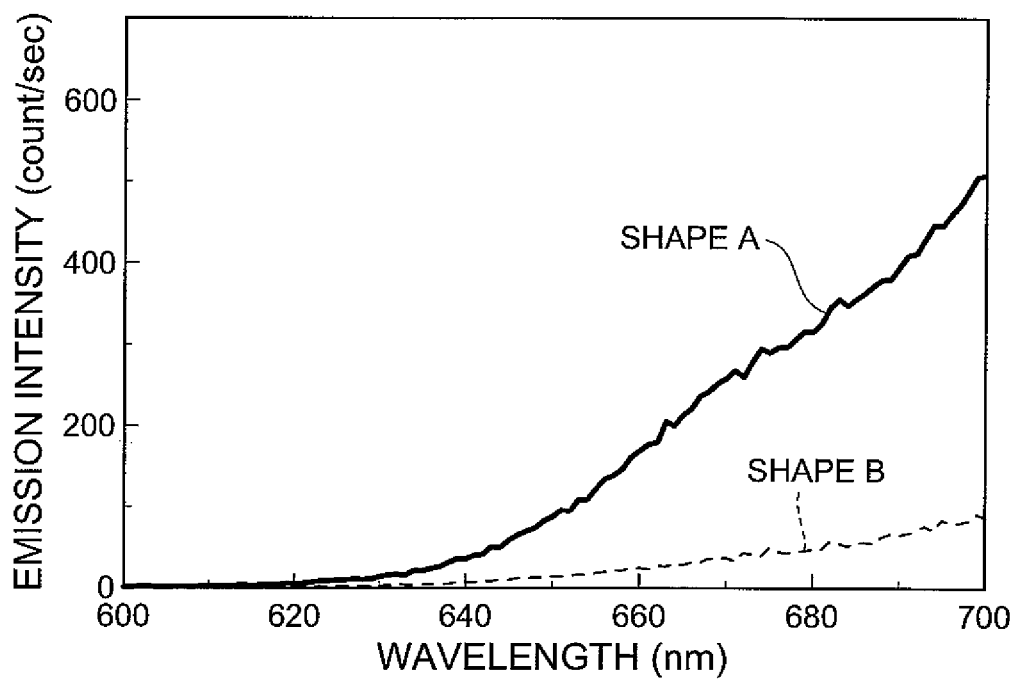
FIG. 14 is a graph showing variation of an emission spectrum of converted light due to crystal shape.

FIG. 14 is a graph showing variation due to crystal shape of the emission spectrum of the converted light generated in the wavelength conversion element 20, with the horizontal axis indicating the wavelength (nm) of the converted light L1 and the vertical axis indicating the emission intensity (counts/sec) of the converted light. In FIG. 14, a solid line in the graph indicates the emission spectrum of the converted light L1 in the case of using the aggregate of crystals of the shape A, and a dashed line in the graph indicates the emission spectrum of the converted light L1 in the case of using the aggregate of crystals of the shape B. As can be understood from these emission spectra, a higher emission intensity is obtained in the case of using the crystals with the shape A of crystal grain form than in the case of using the crystals of shape B that is long in the longitudinal direction.

Based on the above measurement results, in regard to the crystal aggregate 22 used for near-infrared/visible wavelength conversion, the dye molecule crystals 23 are preferably crystal grains with a shape with a width of no more than 1 μm and a length of no more than 10 μm, as described above. Especially preferably, the dye molecule crystals 23 have a granular shape with which the size of one side is no more than 1 μm. By using crystals of such shape, efficiency of wavelength conversion at the crystal aggregate 22 can be improved.

The wavelength-converted light generating apparatus and the wavelength-converted light generating method according to the present invention are not restricted to the embodiments and configuration examples described above and can be modified variously. For example, in regard to the dye molecule used in the wavelength conversion element 20, various dye molecules other than the abovementioned DCM and Rhodamine 6G may be used. Also in regard to the crystal holding unit, besides the holding substrate, holding units of various other forms such as the abovementioned quartz cell may be used, for example. In regard to the configurations of the excitation light supplying optical system and the converted light output optical system for the wavelength conversion element 20, FIG. 1 shows just one example of such configurations and various other configurations may be used instead.

Here, the wavelength-converted light generating apparatus according to the above-described embodiments includes: (1) the excitation light supplying unit supplying the excitation light of the predetermined wavelength; and (2) the wavelength conversion element, in which the dye molecule crystal aggregate is held by the crystal holding unit and which, by incidence of the excitation light, generates the converted light that has been wavelength-converted; and (3) the excitation light supplying unit supplies, as the excitation light, light of a wavelength longer than the absorption edge of the dye molecule to the wavelength conversion element, and (4) the wavelength conversion element, by incidence of the excitation light on the dye molecule crystal aggregate, generates and outputs the converted light that has been wavelength-converted to a shorter wavelength than the excitation light.

The wavelength-converted light generating method according to the above-described embodiments includes: (1) the excitation light supplying step of supplying the excitation light of the predetermined wavelength; and (2) the wavelength conversion step of using the wavelength conversion element, in which the dye molecule crystal aggregate is held by the crystal holding unit, to generate converted light that has been wavelength-converted by incidence of the excitation light on the wavelength conversion element; and (3) in the excitation light supplying step, the light of a wavelength longer than the absorption edge of the dye molecule is supplied as the excitation light to the wavelength conversion element, and (4) in the wavelength conversion step, by incidence of the excitation light on the dye molecule crystal aggregate, the converted light that has been wavelength-converted to a shorter wavelength than the excitation light is generated and output.

In regard to the specific configuration of the wavelength conversion element, preferably in the wavelength conversion element, the crystal holding unit is a substrate (member of substrate form) and the dye molecule crystal aggregate is held on one surface of the substrate. The above-described element having the dye molecule crystal aggregate as the wavelength conversion medium can thereby be configured favorably. Also in this case, the substrate that is the crystal holding unit may include the reflecting unit that reflects the excitation light.

In regard to wavelength bands of especially high utilization value of the excitation light and the converted light, preferably the excitation light is near-infrared light having a wavelength in a range of 750 nm to 2 μm and the converted light is visible light having a wavelength in a range of 400 nm to 750 nm. The wavelength conversion of utilizing near-infrared light as the excitation light and generating visible light of a shorter wavelength than the near-infrared light can thereby be realized favorably.

In regard to the dye molecule that is to be the wavelength conversion medium, the dye molecule crystals contained in the dye molecule crystal aggregate are preferably crystal grains having a shape with a width of no more than 1 μm and a length of no more than 10 μm. With this configuration, the efficiency of the wavelength conversion making use of the near-field light in the dye molecule crystal aggregate can be improved.

The present invention can be applied to a wavelength-converted light generating apparatus and a wavelength-converted light generating method capable of favorably generating light of a shorter wavelength (for example, visible light) than incident light of a predetermined wavelength (for example, infrared light) by wavelength conversion.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A wavelength-converted light generating apparatus comprising:
   an excitation light supplying unit supplying excitation light of a predetermined wavelength; and
   a wavelength conversion element, in which an aggregate of crystals of a dye molecule is held by a crystal holding unit and which, by incidence of the excitation light, generates converted light that has been wavelength-converted; and
   wherein the excitation light supplying unit supplies, as the excitation light, light of a wavelength longer than an absorption edge of the dye molecule to the wavelength conversion element and
   the wavelength conversion element, by incidence of the excitation light on the dye molecule crystal aggregate, generates and outputs the converted light that has been wavelength-converted to a shorter wavelength than the excitation light.

2. The wavelength-converted light generating apparatus according to claim 1, wherein, in the wavelength conversion element, the crystal holding unit is a substrate and the dye molecule crystal aggregate is held on one surface of the substrate.

3. The wavelength-converted light generating apparatus according to claim 2, wherein the substrate comprises a reflecting unit that reflects the excitation light.

4. The wavelength-converted light generating apparatus according to claim 1, wherein the excitation light is near-infrared light having a wavelength in a range of 750 nm to 2 μm and the converted light is visible light having a wavelength in a range of 400 nm to 750 nm.

5. The wavelength-converted light generating apparatus according to claim 1, wherein the dye molecule crystals contained in the dye molecule crystal aggregate are crystal grains having a shape with a width of no more than 1 μm and a length of no more than 10 μm.

6. A wavelength-converted light generating method comprising:
   an excitation light supplying step of supplying excitation light of a predetermined wavelength; and
   a wavelength conversion step of using a wavelength conversion element, in which an aggregate of crystals of a dye molecule is held by a crystal holding unit, to generate converted light that has been wavelength-converted by incidence of the excitation light on the wavelength conversion element; and wherein, in the excitation light supplying step, light of a wavelength longer than an absorption edge of the dye molecule is supplied as the excitation light to the wavelength conversion element, and in the wavelength conversion step, by incidence of the excitation light on the dye molecule crystal aggregate, the converted light that has been wavelength-converted to a shorter wavelength than the excitation light is generated and output.

7. The wavelength-converted light generating method according to claim 6, wherein, in the wavelength conversion element, the crystal holding unit is a substrate and the dye molecule crystal aggregate is held on one surface of the substrate.

8. The wavelength-converted light generating method according to claim 7, wherein the substrate comprises a reflecting unit that reflects the excitation light.

9. The wavelength-converted light generating method according to claim 6, wherein the excitation light is near-infrared light having a wavelength in a range of 750 nm to 2 µm and the converted light is visible light having a wavelength in a range of 400 nm to 750 nm.

10. The wavelength-converted light generating method according to claim 6, wherein the dye molecule crystals contained in the dye molecule crystal aggregate are crystal grains having a shape with a width of no more than 1 µm and a length of no more than 10 µm.

* * * * *